Sept. 12, 1944.  K. G. SIEDSCHLAG ET AL  2,358,259
METHOD OF PRODUCING MOLDED PLASTIC ARTICLES
Filed Sept. 6, 1941    2 Sheets-Sheet 1
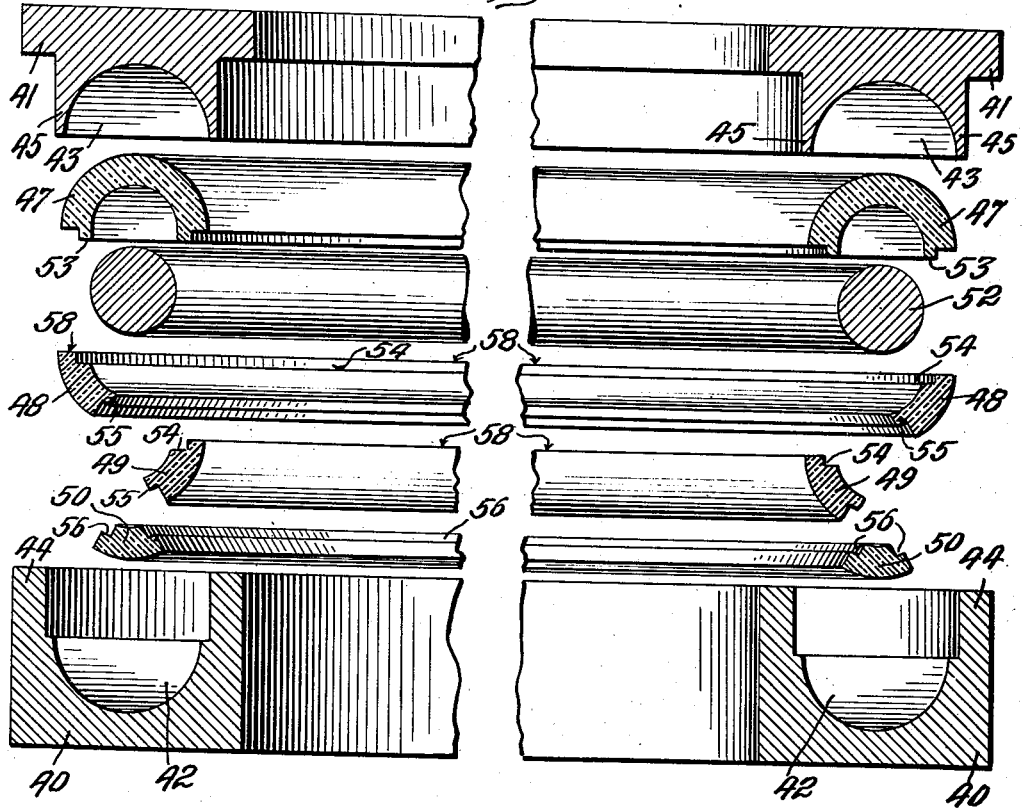
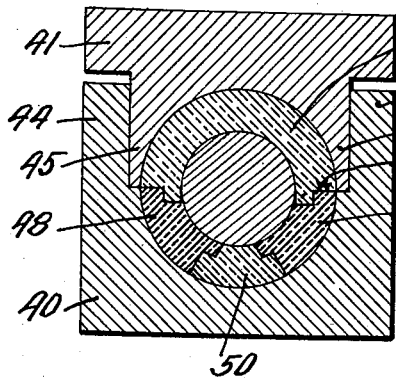
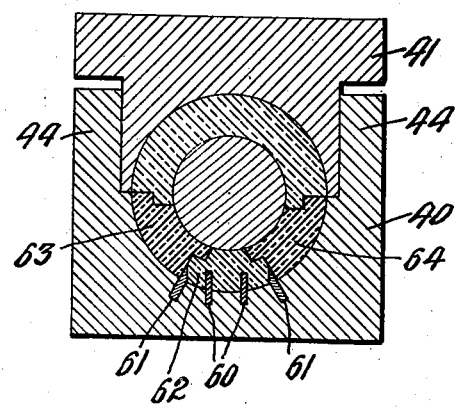
INVENTORS
KARL G. SIEDSCHLAG
CARL F. HILLDRING
BY
English and Studwell
ATTORNEYS Sept. 12, 1944. K. G. SIEDSCHLAG ET AL 2,358,259
METHOD OF PRODUCING MOLDED PLASTIC ARTICLES
Filed Sept. 6, 1941 2 Sheets-Sheet 2
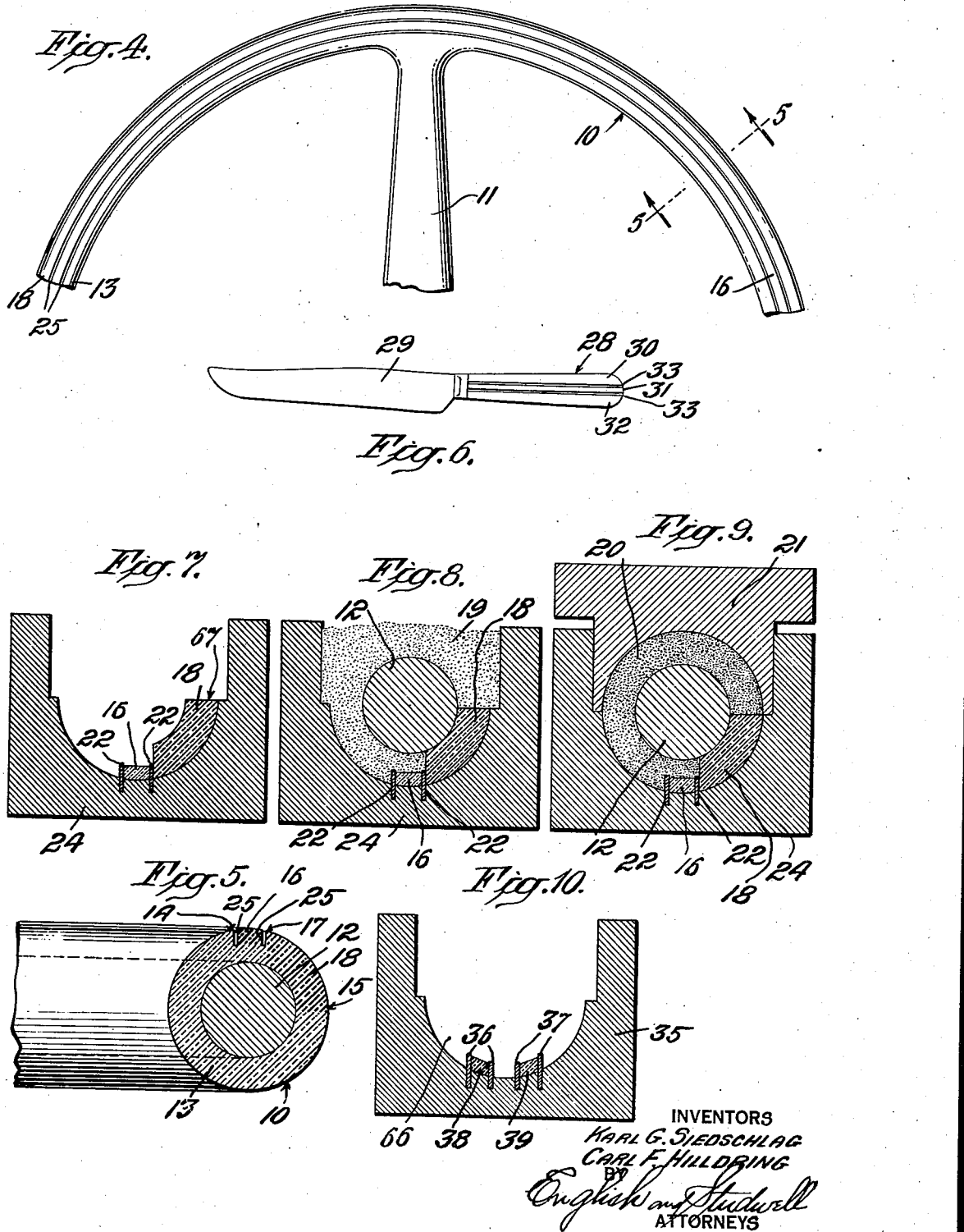
INVENTORS
KARL G. SIEDSCHLAG
CARL F. HILDRING
BY
ATTORNEYS Patented Sept. 12, 1944

2,358,259

UNITED STATES PATENT OFFICE 2,358,259

METHOD OF PRODUCING MOLDED PLASTIC ARTICLES

Karl G. Siedschlag, Kent, and Carl F. Hilldring, Akron, Ohio, assignors to American Hard Rubber Company, New York, N. Y., a corporation of New York Application September 6, 1941, Serial No. 409,874

4 Claims. (Cl. 18—59)

The invention relates to an improved method of producing molded plastic articles.

The invention has been developed in connection with providing the upper surface of the rim and spokes of a steering wheel for automobiles and the like with strips or sections of contrasting colors, but it will be understood that the invention is not to be restricted to the production of steering wheels, since it has been found adaptable to the production of many other articles composed of plastic materials, the outer or upper surface of which it is desired to present in areas of contrasting colors. For simplicity of illustration and description, the invention will be shown and described in connection with the production of the rim of an automobile steering wheel, it being understood that the steps involved in the production of this article are to be followed in the production of any desired article which can be produced by the improved method.

Although various substances may be used for the purpose, the invention has been developed with particular reference to the use of molded thermo-plastic material, of which "tenite" is an illustration. Such thermo-plastic materials in their unmolded condition are usually an aggregate of granular particles, which when subjected to heat and pressure result in the production of a more or less homogenous substance suitable for a great variety of uses, particularly handles of various instruments, stationery articles, automobile steering wheels, the handles of knives and other instruments, and numerous other articles of domestic and commercial use.

In the production heretofore of articles molded from thermo-plastic materials which in unmolded form usually consist of granular particles, the finished molded article has in general been of a uniform color. There has, however, been a demand for articles molded from plastic material showing on their outer surface contrasting colors, but the efforts to meet that demand have not been entirely successful, owing to the difficulty of keeping the differently colored areas sharply distinct from each other. The object of the present invention is to provide in response to this demand molded plastic articles having an outer surface showing a plurality of contrasting colors with sharp lines of demarcation between the variously colored areas, and to provide an improved method of producing such articles.

The plastic materials employed in carrying out the present invention are of the class known as "thermo-plastics" as distinguished from "thermo-setting," that is to say, plastics which although molded into final, set form, are capable of resoftening into different form when subjected to heat and pressure, and are capable of being fused with one or more other articles or premolded sections to constitute a new entity. This quality of the thermo-plastic material is made use of in carrying out the present invention. In practicing the improved method of the invention to produce a molded article composed of sections or areas having an outer surface showing a plurality of contrasting colors with sharp, distinct lines of demarcation, the improved article may be formed wholly from preformed or premolded sections, partly from premolded sections and partly from unmolded material, or it may be made wholly from unmolded plastic material held in groups separate from each other in the mold. Whether one phase of the invention or another will be practiced to produce the improved article will depend entirely upon the kind of article to be produced and the effects desired on the surface of the finished article.

When it is desired to construct the steering wheel or other molded article entirely from preformed sections, the shape and size of these preformed sections will be such that when they are assembled together they will fit and fill the mold for producing the desired article. After having been assembled in the mold, which is conveniently of two parts, a lower part and an upper part, the mold is subjected to heat and pressure so that the contiguous portions of the preformed sections of the article will fuse together, with the result that when the mold has cooled sufficiently to permit the removal of the article therefrom the previously separate preformed sections have been welded together into the desired shape, presenting on its outer surface the various areas formed by the differently colored preformed sections constituting the article. These surface areas will present the contrasting colors of the preformed sections and each section in the mold will remain in substantially its original shape, so that the welded joints between the differently colored sections will be sharp and not indistinct as in former methods. It will be understood that a great variety of colors can be employed, for example, green, yellow, tan, blue, red and other attractive colors. If the preformed sections which are to constitute the complete article are placed in the mold with contiguous edges or sides, the outer surface of the article will show as distinct areas the outer surfaces of what were formerly the preformed sections contiguous to each other. It is sometimes desirable, however, to separate in the mold the juxtapositioned preformed sections by means of webs or partition strips projecting inwardly from the inner surfaces of the mold. To accommodate these webs or partition strips the preformed sections at their outer surfaces will be provided with appropriately formed recesses. The result will be in the outer surface of the complete molded article narrow grooves which had been occupied by the webs. These grooves can be left unfilled, but we prefer to fill them with a self-hardening plastic of a color contrasting with the colors of the preformed sections. A black self-hardening plastic has been found highly attractive in conjunction with the other colors.

In those cases where the completed article is to be composed partly of preformed sections and partly of previously unmolded plastic material, the preformed sections are preferably arranged in the lower half of the mold cavity, and they may or may not be separated by the webs or partition plates. In the practice of this phase of the improved method either one or more preformed sections may be used. The preformed article sections having been been placed in proper position in the mold cavity, the remainder of the cavity is filled with the appropriate amount of unmolded thermo-plastic material, usually in granular form, to produce the desired article. The upper or plunger half of the mold is then brought down onto the granular material in the lower mold cavity to compress it into requisite shape, while heat is applied to soften it sufficiently to cause it to amalgamate and then solidify. During the molding operation the surfaces of the preformed sections of the article become softened so that the softened granular material fuses with them, with the result that when the molding operation has been completed and the mold is sufficiently cold for the removal of the completed article the various sections of the molded article adhere together in the same manner as when the molded article is composed entirely of preformed sections.

In those cases in which it is desired to produce the complete article from groups of previously unmolded thermo-plastic material, the lower mold cavity will be provided with upwardly projecting webs or partition plates. The differently colored groups of unmolded thermo-plastic material, usually in granular form, is placed in the compartments formed by the partition strips in the lower mold cavity. This material may be filled up to any desired level in the lower mold cavity, and then the remainder of the mold may be filled with unmolded plastic material of a different color, after which the upper or plunger part of the mold is brought down upon the unmolded plastic material, compressing it into the desired form while it is being subjected to the requisite heat to soften it for fusing together into a complete entity. The grooves left in the surfaces of the article by the partition strips may then be filled with the self-hardening plastic.

The improved method of producing articles is more fully and specifically described hereinafter and are particularly pointed out in the appended claims.

In the accompanying drawings illustrating forms of the improved article composed of molded thermo-plastic material and indicating a mold in which and the steps of the method by which it may be produced, Fig. 1 is a transverse section through an annular mold (with the middle part broken away) for producing the rim of a steering wheel, the mold parts being separated, together with the preformed sections, and the metallic insert, which are to compose the wheel rim, all shown in position to be assembled in the mold; Fig. 2 is a cross section through one side of the assembled mold with the preformed wheel rim sections therein; Fig. 3 is a view similar to Fig. 2, but with the lower mold part provided with webs or partition strips for producing the relatively narrow grooves in the outer surface of the molded article; Fig. 4 is a top plan view of a portion of a steering wheel for automobiles or the like embodying the invention; Fig. 5 is a transverse section, on an enlarged scale, taken on the line 5—5 of Fig. 4; Fig. 6 is a side elevation of a case knife, the handle of which embodies the invention; Figs. 7 to 9, inclusive, are cross sections of one side of the annular mold for producing the improved rim shown in Fig. 4; Fig. 7 showing the lower half of the mold with two preformed wheel rim sections located therein, Fig. 8 showing the remainder of the lower half of the mold filled with granular plastic material, and Fig. 9 showing the condition of the mold after the upper or plunger half thereof has been brought down into the lower mold half to compress the granular plastic material; and Fig. 10 is a section of the lower half of the mold showing a different arrangement of the preformed wheel rim sections therein to produce a different effect or color scheme on the upper surface of the rim of the steering wheel.

Both the rim and the spokes may be composed of sections of contrasting colors, but for the purpose of describing and illustrating the invention the steps followed in forming the rim only will be given, it being understood that the same sequence of steps will be followed in producing the spokes, and also other articles.

The production of a steering wheel rim composed entirely of preformed sections, is illustrated in Figs. 1, 2 and 3. It is assumed that the wheel rim to be produced is circular, although it may be of any other contour in plan, and may be only an arc. If the wheel rim is circular or annular in plan, the mold in which it is formed will also be annular, and Fig. 1 is a transverse section through such a mold, and through the preformed circular sections and the metal reinforcing insert which together will form the wheel rim. The lower mold part is indicated at 40 and the upper or plunger mold part at 41. The mold cavity 42 in the lower mold part 40 is semi-circular in cross section, as is also the mold cavity 43 in the upper mold part, it being understood that the wheel rim in cross section may have any preferred contour, and that the cross section of the mold cavity will vary accordingly. The lower mold part is provided, extending upwardly beyond the mold cavity 42, with two walls 44 spaced apart to receive between them the downwardly extending walls 45 which form the mold cavity 43 in the upper mold part 41. It has been found convenient in the production of molded wheel rims that the upper part or half of the wheel rim be formed in the lower mold cavity and the lower part or half of the wheel rim be formed by the upper mold cavity.

The number of preformed wheel rim sections used to produce the complete wheel rim will depend upon the number of contrasting colors desired in the wheel rim. Usually the lower part of half of the wheel rim will be a full semi-circle of one color, whereas the sections composing the upper part or half of the wheel rim will in cross section be arcs of the circle. In the wheel rim illustrated in Figs. 1 and 2, the preformed section which will constitute the lower part or half of the wheel rim is indicated at 47 and it will be noted that it is in cross section a full semicircle. The top part or half of the wheel rim in this embodiment of the invention is composed of three sections, the side or lateral sections 48 and 49, and the middle or top section 50. It will be seen that these wheel rim sections are concave to receive and fit over the metal reinforcing insert 52 which is round in cross section. In order that the preformed wheel rim sections may the more firmly hold together after having been fused together to form the complete wheel rim, the wheel rim section 47 is provided with the tongues 53 which are received in the recesses 54 formed in the upper edges of the side rim sections 48 and 49, and the rim sections 48 and 49 are provided with the tongues 55 which are received in the recesses 56 formed in the inner edges of the middle or top wheel rim section 50.

In assembling the preformed wheel rim sections and the metal insert 52, the top or middle section 50 is placed in the center of the lower mold cavity 42, as shown in Fig. 2, and the two side or lateral sections 48 and 49 are placed beside the middle section so that the tongues 55 fit into the recesses 56 in the middle rim section 50. It will be noted that the top edges 58 of the said rim sections 48 and 49 come flush with the upper edge of the lower mold cavity 42. The circular metal reinforcement insert 52 is then placed in the cavity formed by the wheel rim sections 48, 50 and 49. The lower wheel rim section 47 is then placed upon the metal insert with the tongues 53 of the section 47 fitting in the recesses 54 in the upper edges of the side rim sections 48 and 49. The upper or plunger part of the mold is then brought down upon the wheel rim section 47 and the usual molding operation performed, that is, the mold parts being held together under pressure while heat is applied sufficient to cause the contacting sides or edges of the preformed wheel rim sections to fuse so as to be inseparable when the complete wheel rim has cooled.

In case it is desired to have relatively narrow grooves in the outer surface of the upper part of the wheel rim, which may or may not be filled with a self-hardening plastic of a color contrasting with the color of the premolded rim sections, the inner surface of the lower mold cavity will be provided with inwardly projecting webs or partition strips. In Fig. 3 there are shown four such strips in the bottom of the middle part of the lower mold cavity, the two middle ones 60 being in cross section rectangular, whereas the two outer 61 are pyramidal so that the middle or top preformed wheel rim section 62, which is provided with grooves corresponding to the strips 60 and 61 may be readily placed over and removed from the strips 60 and 61. The lower mold cavity may also be provided with inwardly and upwardly projecting strips adapted to enter grooves formed in the side or lateral preformed wheel rim sections 63 and 64.

The production of a molded article in which the groups of sections which are to compose the complete molded article are in part preformed and in part unmolded plastic material is exemplified in Figs. 7, 8 and 9. In these figures the lower mold part is indicated at 24 and the upper or plunger mold part at 21. The premolded wheel rim section which is to occupy the middle of the uppermost part of the wheel rim is indicated by the circular preformed rim section 16 and one of the lateral or side rim sections composed of premolded material at 18. The middle top section 16 of the wheel rim is located between two webs or partition strips 22 projecting upwardly from the bottom of the mold cavity of the lower mold part 24. One edge of the premolded wheel rim side section 18 abuts against one of the webs 22 and the upper edge 67 is coincident with the upper edge of the mold cavity of the lower mold part 24. The reinforcing metal insert is indicated at 12. In the practice illustrated in Figs. 7, 8 and 9 the pre-formed section supports the metal insert 12 in properly centered and spaced relation with reference to the inner wall of the mold cavity. The remainder of the mold cavity of the lower mold part 24 is filled with unmolded thermoplastic material in granular form, indicated at 19. The upper plunger part 21 of the mold, as indicated in Fig. 9, is then brought down upon the unmolded granular material 19 so as to compress it into the wheel rim section indicated at 20. When the upper or plunger part 21 of the mold is brought down on the unmolded material in the mold part 24 while the mold is heated, the unmolded material is fused and the exposed edges of the premolded rim sections 16 and 18 are also fused, with the result that the unmolded material coheres with the edges of the softened rim sections 16 and 18, and upon the completion of the molding operation and the cooling of the wheel rim there is produced the wheel rim 10 shown in Fig. 4 of which one of the spokes is indicated at 11.

The material composing the rim of the steering wheel shown in Fig. 4 surrounding the metal reinforcing insert 12 taken in counter-clockwise direction from the point 14, referring to Fig. 5, around to the point 15 is produced by the molding operation from the previously unmolded material 19 shown in Fig. 8. The circular strip or ribbon portion 16 of the rim of the steering wheel extending laterally in a clockwise direction from the point 14 to the point 17 is the preformed rim section 16 shown in Fig. 7, and the outer circumferential strip or section 18 of the rim of the steering wheel extending in clockwise direction from the point 17 to the point 15 is the premolded rim section 18 of Fig. 7. The granular material indicated at 19 in Fig. 8 and thereafter softened and set by the molding operation is indicated by the stippled part 20 of Fig. 9 and section 13 of Fig. 5.

During the molding of the rim of the steering wheel, as indicated in Figs. 7 to 9, it will be observed that the preformed thermo-plastic material constituting the rim sections 16 and 18 are held in position by the webs or partition strips 22 extending inwardly from the inner wall of the cavity of the lower mold part 24. When the molding operation has been completed, as indicated in Fig. 9, and when the article has set and is removed from the mold, the portions of the rim formerly occupied by the strips 22 constitute in the molded article as it is removed from the mold the circumferential grooves 25, which were the original grooves in the preformed rim sections. These grooves are relatively narrow, as in the practice of the invention indicated in Fig. 3, and in the finished article are preferably filled with a self-hardening plastic, of a color contrasting with the colors of the preformed sections 16 and 18 and the previously unmolded material 13.

Although the invention was developed in connection with the production of steering wheels, the upper portions of the rims of which are composed of areas or circular strips of contrasting colors, the invention has been successfully employed in the production of articles composed of thermo-plastic material in which it is desirable to have a surface showing contrasting colors, as for example, the handle portion 28 of a case knife 29 in which the three sections 30, 31 and 32 of the handle may be of differently colored plastic materials. During the molding operation the section 31 may be of preformed plastic material inserted in the mold and held there by webs or strips corresponding to the strips 22 of Fig. 7, whereas either or both the lateral sections or portions 30 and 32 of the knife handle may be formed in the mold from granular plastic material. The webs of the mold will leave grooves in the knife handle, indicated at 33, which may be filled with a self-hardening plastic material contrasting in color with the color of sections 30 and 32.

In Fig. 10 there is illustrated an arrangement in which there are four webs or strips projecting upwardly from the bottom of the mold cavity 66 of the lower mold part 35, corresponding to the upwardly extending webs or strips 60 and 61 of Fig. 3, but in this instance there is a preformed wheel rim section 38 located between the webs 36 and a wheel rim section 39 of contrasting color between the strips 37, the remainder of the mold cavity with the exception of the metal insert 12 being filled with unmolded, or granular, thermo-plastic material, contrasting in color with the preformed rim sections 38 and 39. Or, omitting the preformed wheel rim sections 38 and 39, the space between the two pairs of partition strips 36 and 37 may be filled with unmolded or granular thermo-plastic material of contrasting color and the remainder of the mold cavity with the exception of that part occupied by the metallic insert may be filled with unmolded material of still another color.

It will thus be understood that, given the principle of the invention, the arrangement of the differently colored sections of the thermo-plastic material and the article produced according to the practice of the method of the invention may be varied indefinitely, whereby the completed molded article may be composed entirely of preformed sections, partly of preformed sections and partly of previously unmolded material, or wholly of previously unmolded material. Such is the nature of thermo-plastic materials that no matter which one of the three methods of the invention is employed the result which is embodied in the complete mold is the same, it being impossible to differentiate between the sections which are formed from previously molded material and previously unmolded material.

For example, it will be noted from an observation of Figs. 8 and 9 that at the point where the granular material 19 contacts with one wall or side of the arcuate preformed segment 18, there is no partition strip and yet in the completed article there is a sharp line of demarcation between the coalesced segments 13 and 18, and it would be impossible to say whether one or the other segment is composed of preformed or previously unmolded thermo-plastic material. The same observation is where properly prepared preformed sections are held contiguous to each other in the mold, as indicated in Fig. 2, and in the finished articles abut each other as segments of contrasting colors without the interposition of filler strips of self-hardening plastic material.

It will be understood that at the point where granular plastic material contacts with the solid preformed sections the softening or melting of the granular material under pressure causes it to coalesce with the adjacent softening wall or walls of the solid preformed sections. Accordingly, by making one or more preformed sections thicker radially than the portion of the article formed from the previously unmolded plastic material and one or more solid preformed sections of the same radial thickness as the portion of the article made from the previously unmolded material, the fusing and subsequent solidification of the previously unmolded plastic material with the preformed sections results in the production of a substantially integral body. It will be understood, however, that during the softening or fusing and solidification of the previously unmolded plastic material under heat and pressure and the softening of the contiguous sides or edges of the preformed sections, the main portions of the preformed sections remain in substantially their original condition. As a result, the improved article produced by the practice of the method of the invention consists of differently colored solid segments or sections of plastic material coalesced at their contacting surfaces so as to constitute a substantially integral body.

Having thus described the invention what we claim as new is:

1. The method of producing an article from heat molded thermo-plastic material and having an outer surface composed of separate parallel sections of contrasting colors, which consists in heat molding a plurality of colored sections with outer surfaces to constitute integral outer surface sections of the article, placing a number of the preformed sections insufficient to completely fill the mold in parallel relation in a mold with the outer surfaces of the preformed sections against the wall of the mold cavity, filling the remainder of the mold cavity with thermo-plastic material of a color different from the colors of the preformed sections, and completing the molding operation by the application of heat and pressure to the mold so as to soften and solidify the plastic material and cause it to coalesce with the contacting surfaces of the preformed sections.

2. The method of producing an article from molded thermo-plastic material and having an outer surface composed of separate parallel sections of contrasting colors which consists in preforming a plurality of colored sections from said material with outer surfaces to constitute integral parallel outer surface sections of the article, placing a number of the preformed sections insufficient to completely fill the mold in a mold with the outer surface of the preformed sections against the inner wall of the mold cavity, separating the preformed sections by relatively thin parallel metal strips projecting inwardly from the inner wall of the mold cavity, filling the remainder of the mold cavity with thermo-plastic material of a color different from the color of the preformed sections and then softening the plastic material under heat and pressure to cause it to coalesce with the surfaces of the preformed sections.

3. The method of producing a molded article from thermo-plastic material having its outer surface composed of separate parallel sections of contrasting colors which comprises pre-molding at least one of said colored sections to provide a face to fit against the interior of a mold cavity in such manner as to constitute an outer surface section of the article, placing said pre-formed colored section in the mold cavity with said face against the interior wall of the mold cavity, the size of said section being insufficient to completely fill the mold cavity separating said pre-formed section from the rest of the cavity by a thin strip projecting inward from the inner wall of the mold cavity whereby to form a groove in the completed article, filling the remainder of the mold cavity with thermo-plastic material of a color different from the color of the aforesaid pre-molded section, applying heat and pressure through the parts of the closed mold to weld the contents of the mold into a unitary article, and, after removing the article from the mold, filling the aforesaid groove with a material of a color differing from other colors on the surface of the article.

4. A method of producing a decorated automobile steering wheel rim comprising a metallic rim encased in molded thermo-plastic material having its exposed surface composed of parallel stripes of different colors which method includes premolding a section of the thermo-plastic material of a selected color to constitute one of said stripes, placing said premolded section in the cavity of the mold with its face fitting against the wall of the mold, supporting the metallic rim on said premolded section to locate said rim with reference to the mold, preforming other colored sections of thermo-plastic material in such manner as to provide faces to fit the inner wall of the mold, placing a number of said other colored sections insufficient to completely fill the mold in parallel relation in the mold with said faces fitting against the inner wall of the mold, separating said other sections from each other by thin curved metal strips, filling the remainder of the mold cavity with thermo-plastic material of a selected color and closing the mold, and applying heat and pressure to the mold sufficient to weld the mold contents into a unitary structure.

KARL G. SIEDSCHLAG.
CARL F. HILLDRING.